April 19, 1927.  
J. B. HOLLAND  
1,625,364  
REVERSING GEAR FOR LOCOMOTIVES  
Filed June 17, 1926 3 Sheets-Sheet 3

INVENTOR  
J. B. Holland  
BY  
ATTORNEYS

Patented Apr. 19, 1927.

1,625,364

UNITED STATES PATENT OFFICE.

JOSEPH B. HOLLAND, OF BALTIMORE, MARYLAND.

REVERSING GEAR FOR LOCOMOTIVES.

Application filed June 17, 1926. Serial No. 116,675.

My invention relates to improvements in reversing gears for locomotives, and it consists in the combinations, constructions and arrangements herein described and claimed.

An object of the invention is the provision of a reversing gear mechanism which is adapted to be connected with the reach rod of a locomotive and which not only can be operated manually with relatively great ease but affords facilitates for preventing accidental retrograde movement of the reach rod from any position to which it may have been shifted.

A still further object of the invention is the provision of a thoroughly practical manually operable reversing gear mechanism for locomotives, said reversing gear comprising but relatively few parts.

A still further object of the invention is the provision of a reversing gear mechanism of the character described which includes a housing for the principal operating parts of the mechanism.

Other objects and advantages of the invention will be apparent from the following description, considered in conjunction with the accompanying drawings, in which—

Figure 1:
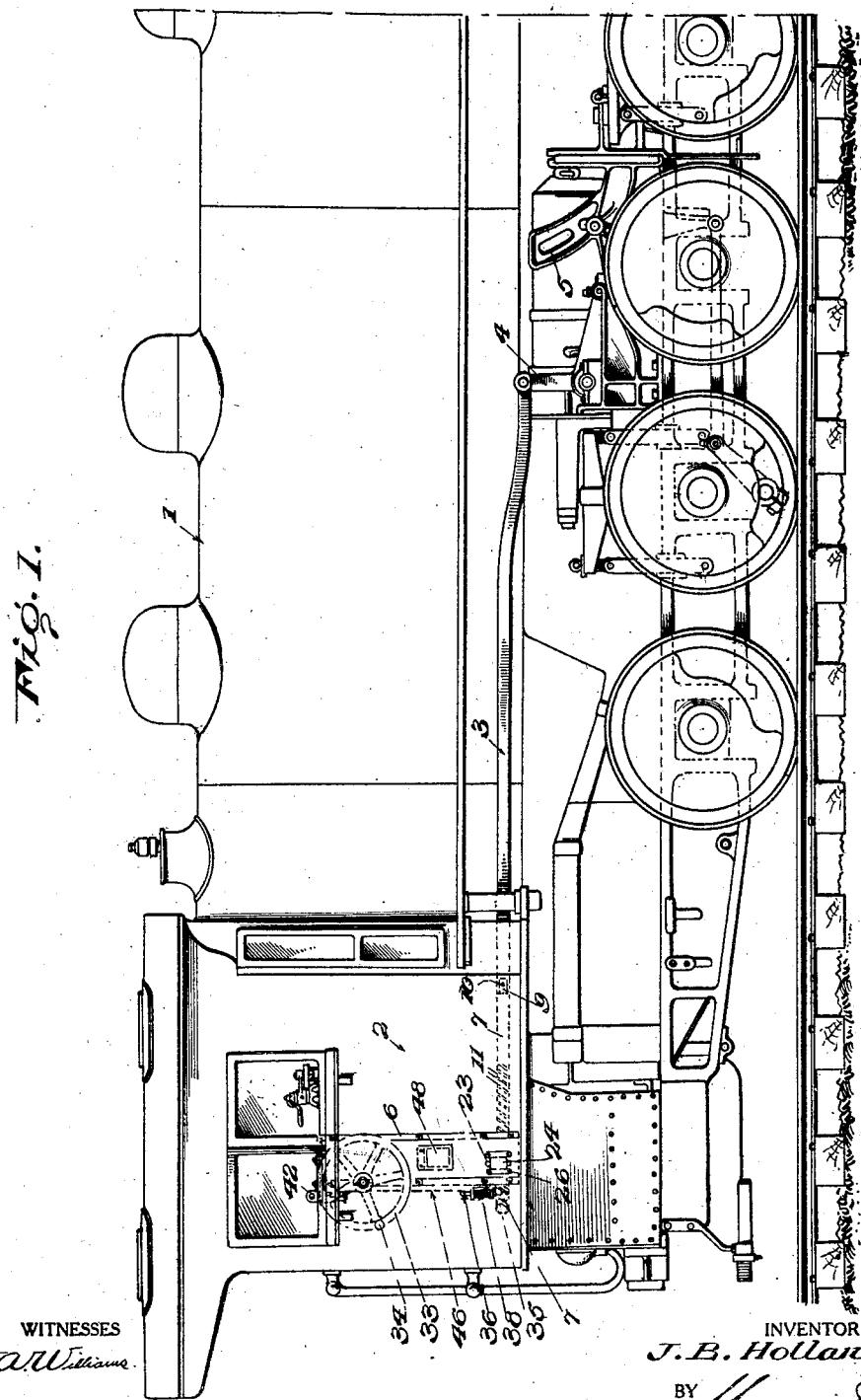
Figure 2:
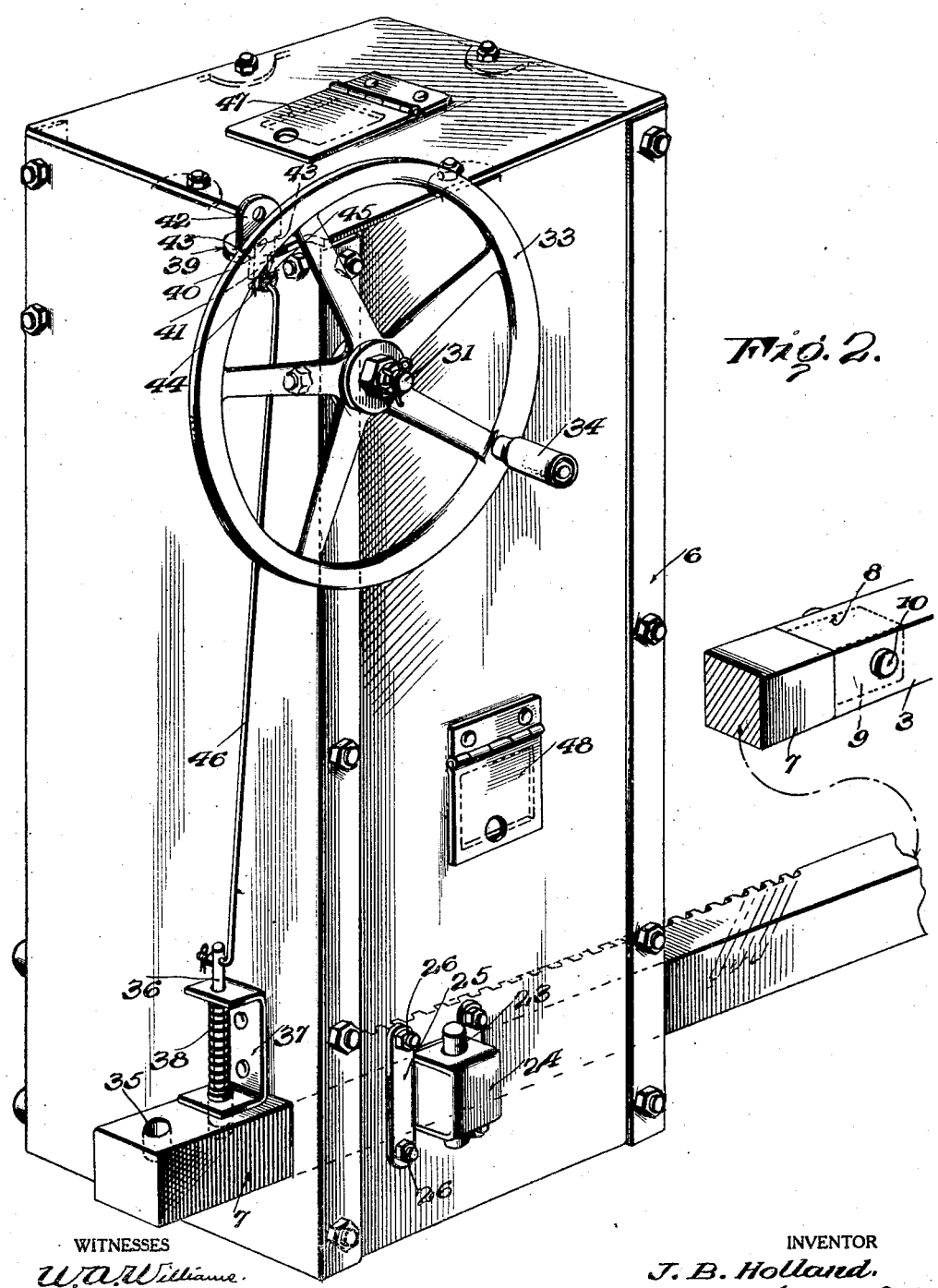
Figure 3:
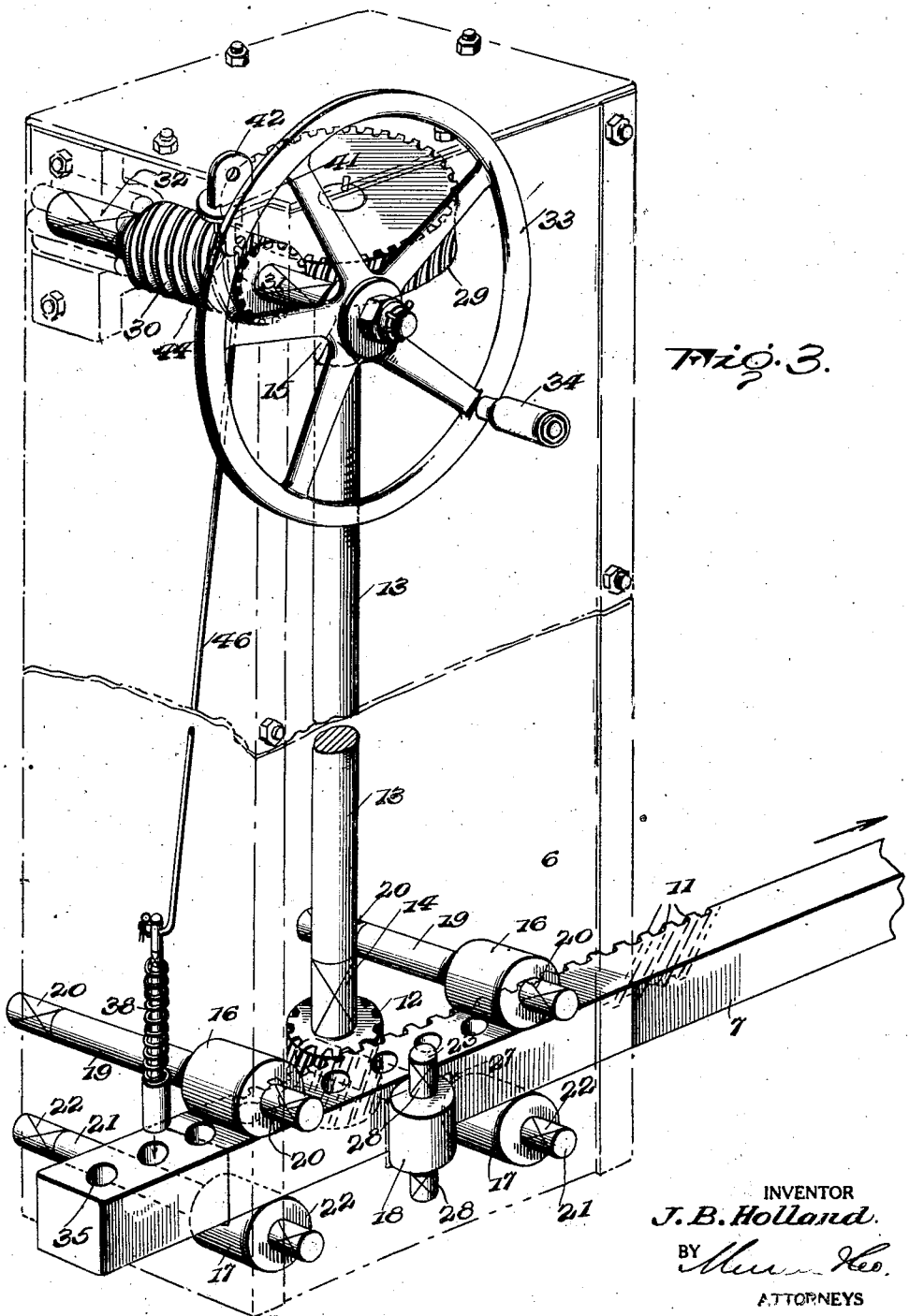

Figure 1 is a partial side elevation of a locomotive equipped with the reversing gear mechanism embodying the invention, Figure 2 is a perspective view of the reversing gear mechanism, Figure 3 is a perspective view of the reversing gear mechanism with some of the supporting elements thereof omitted and certain of the bearings for shafts of the device shown diagrammatically, the housing of the device being indicated by dotted lines and certain of the parts within the housing being shown in full lines.

In Figure 1 the numeral 1 generally designates a locomotive having a cab 2. The usual reach rod 3 of the locomotive is connected adjacent to its forward end through a bell-crank lever 4 with the usual reversing link 5 of the locomotive. The reach rod 3 extends rearwardly along the locomotive frame into the cab 2.

The supporting structure of the reversing gear mechanism that the invention provides includes a box-like housing 6 which is secured in upright position in any suitable known manner in the cab 2 so that the lower end portion of the housing 6 is disposed at the rear of the rearward end of the reach rod 3. The lower end portions of the front and rear walls of the housing 6 are provided with aligned openings through which a rack bar 7 extends. The rack bar 7 is non-circular in cross sectional configuration and the openings in the front and rear walls of the housing 6 through which the rack bar extends are correspondingly configured.

The rack bar 7 is rigidly secured at its forward end to the rearward end portion of the reach bar 3 and this connection of the rack bar with the reach bar may be effected by providing a non-circular socket 8 in the rearward end of the reach bar 3, then reducing the forward end portion of the rack bar 7 at 9 to fit in the socket 8 and finally securing the lapped portions of the reach bar and the rack bar to each other by a transverse pin 10.

As best seen in Figure 3, the rack bar 7 extends through the housing 6 adjacent to one side wall of the housing. The teeth, indicated at 11, of the rack bar are formed in its inner side wall. A relatively wide pinion 12 on the lower end of a vertical driven shaft 13 is engaged with the teeth of the rack bar 7 so that rotation of the driven shaft 13 will cause axial movement of the rack bar 7 and consequently axial movement of the reach rod 3.

The driven shaft 13 is journaled, preferably anti-frictionally, in suitable bearings, such as indicated diagrammatically at 14 and 15 in Figure 3. Any suitable known construction may be employed to rotatably support the driven shaft 13 so that the shaft 13 will turn with but relatively little friction.

The means that the invention provides for guiding the rack bar 7 through the lower portion of the housing 6 and for retaining the rack bar 7 against the pinion 12 comprises pairs of vertically spaced horizontal rollers 16 and 17, respectively, in rolling contact with the upper and lower faces, respectively, of the portion of the rack bar that extends through the housing 6 and a vertical roller 18 which is in rolling contact with the outer side face of the portion of the rack bar that extends through the housing 6 directly opposite the pinion 12. One pair of the rollers 16—17 is disposed adjacent to the rear wall of the housing 6 and the other pair of rollers 16—17 is disposed adjacent to the front wall of the housing 6. The rollers 16 are carried by short shafts 19 which are journaled within the housing 6 in suitable anti-friction bearings, as indicated diagrammatically at 20 in Figure 3. The rollers 17 are secured on short shafts 21 which likewise are journaled anti-frictionally in suitable bearings indicated diagrammatically at 22. The roller 18 is secured on a short shaft 23 which may extend through vertically aligned openings in a small bearing box 24 having an attaching strip 25 at its edge secured at 26 to a side wall of a housing 6 in position to cover an opening 27 in the side wall of the housing 6. The shaft 23 is supported anti-frictionally as indicated diagrammatically at 28 in Figure 3 in the bearing box 24 and the roller 18 extends through the opening 27 in the housing 6 and against the outer side face of the rack bar 7. The rack bar thus will be supported for axial movement with but relatively little friction between the rack bar and its supporting members, and the rack bar will be retained in mesh with the pinion 12.

The upper end portion of the driven shaft 13 carries a worm wheel 29 to which motion may be imparted by a worm 30 that is formed on a drive shaft 31. The drive shaft 31 is journaled anti-frictionally in suitable bearings, as at 32 in Figure 3 and one end portion of the drive shaft 31 protrudes from the housing 6 through a suitable aperture in the side wall of the housing 6 and carries a hand wheel 33 which may have a hand grip member 34 secured to the rim portion thereof. It is obvious that with the construction described so far, turning of the hand wheel 33 and of the drive shaft 31 will cause rotation of the driven shaft 13 and longitudinal movement of the rack bar 7 and the reach rod 3 as a unit in the desired direction. Accidental retrograde movement of the rack bar and reach rod from adjusted position will be obviated by reason of the provision of the worm wheel 29 and the worm 30 in the operating mechanism as hereinbefore described since it will be understood that the worm wheel 29 and the worm 30 comprise a locking arrangement for preventing rotation of the drive shaft 31 as a result of any stress on the reach rod and rack bar tending to move the reach rod and rack bar axially. It also is desirable that the rack bar and the reach rod should be locked positively against displacement from adjusted position as a result of accidental turning of the hand wheel 33 and the drive shaft 31. To this end, the invention provides a longitudinal series of spaced sockets or depressions 35 in the upper side of the rack bar 7 and a vertically shiftable latch bolt 36 which has limited vertical movement in vertically aligned openings in spaced arms of a bracket 37 that is secured to the housing 6 above the rack bar 7.

The lower end portion of the latch bolt 36 is adapted to enter and engage with any one of the sockets 35 in the upper side of the rack bar when said socket is located underneath the latch bolt 36 and the latch bolt 36 has been forced downward to the limit of its downward movement by the action of a suitable expansion spring 38. The expansion spring 38 encircles the latch bolt between the arms of the bracket 37. A laterally extending lug 39 on the upper end portion of the housing 6 has a vertical aperture 40 through which the shank 41 of a latch operating plate 42 extends slidably. Downwardly facing shoulders, as at 43 are provided at the juncture of the shank 1 and the plate 42 for engaging with the upper face of the lug 39 to limit the downward movement of the shank 41 in the opening 40 and thus to limit the downward movement of the latch bolt 36, with which the lower end portion of the shank 41 is connected by a link 46. When the shoulders 43 are in contact with the upper face of the lug 39, the latch bolt 36 is permitted to move downward under the influence of the spring 38 as required to enter and engage with one of the sockets 35 in the rack bar 7 and the rack bar 7 then will be held positively against axial movement in either direction. When desired the plate 42 may be grasped and moved upward until a lateral shoulder 44 at the top of a notch 45 in the edge of the shank 41 is in position to engage with the upper face of the lug 39 and when the shoulder 44 has been moved in engagement with the upper face of the lug 39, the lower end of the latch bolt 36 will be held in upwardly raised position slightly above the plane of the upper face of the rack bar 7.

The top wall and one of the side walls of the housing 6 may be provided with suitable openings to permit inspection of the parts within the housing or oiling of the bearing and relatively moving contact parts of the mechanism within the housing, such openings in the top wall and said one side wall of the housing 6 normally being closed by hinged doors 47 and 48, respectively.

From the foregoing description of the various parts of the device, it will be manifest that the invention provides a reversing gear mechanism for locomotives which can be operated manually easily and which will be positive in action and will be held automatically against accidental retrograde movement from any adjusted position. The operating parts of the device are housed and protected and the movement of the operating parts of the device will be attended by but relatively little friction so that the device is not likely to be worn out quickly in service.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. In a gear reversing mechanism for locomotives, a rack bar adapted for connection with the reach rod of a locomotive, a housing having aligned openings in opposite walls thereof through which said rack bar extends, pairs of horizontal rollers rotatably supported within said housing adjacent to said opposite walls of the housing, the rollers of each pair respectively being in rolling contact with the upper and lower faces of said rack bar, the teeth of said rack bar being on the inner face of the rack bar, a vertically disposed rotary shaft within said housing having its lower end portion located adjacent to the inner side of said rack bar, a pinion secured to the lower end portion of said shaft in mesh with the teeth of said rack bar, and a vertically disposed roller in rolling contact with the outer side face of said rack bar for cooperating with said horizontal rollers to support said rack bar for guided movement in the direction of the length of the rack bar and for retaining said rack bar in engagement with the pinion.

2. In a reversing gear mechanism for locomotives, a rack bar rigidly secured at one end to the reach rod of a locomotive, a housing of box-like form having aligned openings in the lower end portions of opposite walls thereof through which said rack bar extends, a rotary drive shaft protruding from the upper end portion of said housing, motion transmitting means between said drive shaft and said rack bar, said rack bar having a longitudinal series of sockets in one face thereof, and a spring pressed latch bolt engageable with one of said sockets to hold said rack bar against longitudinal movement from adjusted position.

3. In a reversing gear mechanism for locomotives, a longitudinally movable bar adapted for connection with the reach rod of a locomotive, a supporting structure adjacent to said bar, manually operable means carried by said supporting structure for shifting said bar longtudinally to effect corresponding movement of the reach rod, said bar having a longitudinal series of sockets in its upper face, a latch bolt supported for limited vertical movement at the upper side of said bar, spring means urging said latch bolt vertically downward toward said bar, said latch bolt being adapted to enter and engage any one of said sockets in said bar when said socket is located underneath said latch bolt and said latch bolt is actuated by said spring, a laterally extending lug carried by said supporting structure above said latch bolt, said lug having a vertical aperture, an apertured hand plate having a shank slidable in the aperture of the lug, a link connecting the lower end of said shank with said latch bolt, said plate having a shoulder for engaging with the upper side of said lug when said latch bolt is at the limit of its downward movement under the actuation of said spring, said shank of the hand plate having a lower shoulder adapted to engage with the upper face of said lug to retain said latch bolt in its raised position and out of engagement with a socket of said bar.

4. In a reversing gear mechanism for locomotives, a box-like housing adapted to be disposed in the cab of a locomotive, said housing having aligned openings in the lower end portions of opposite walls thereof, a rack bar adapted to be rigidly connected at one end with the reach rod of the locomotive and to extend slidably through said aligned openings in the lower end portions of said opposite walls of the housing, a drive shaft protruding from the upper end portion of said housing, a hand wheel on the outer end of said drive shaft, means disposed between said drive shaft and said rack bar for transmitting motion from said drive shaft to said rack bar, said housing having openings in a plurality of walls thereof to permit access to the mechanism within the housing for oiling and inspection, and hinged doors closing said openings.

JOSEPH B. HOLLAND.